Sept. 24, 1963 R. K. KAMINSKI 3,104,543
ACOUSTICAL VIBRATION TEST DEVICE
Filed May 5, 1960
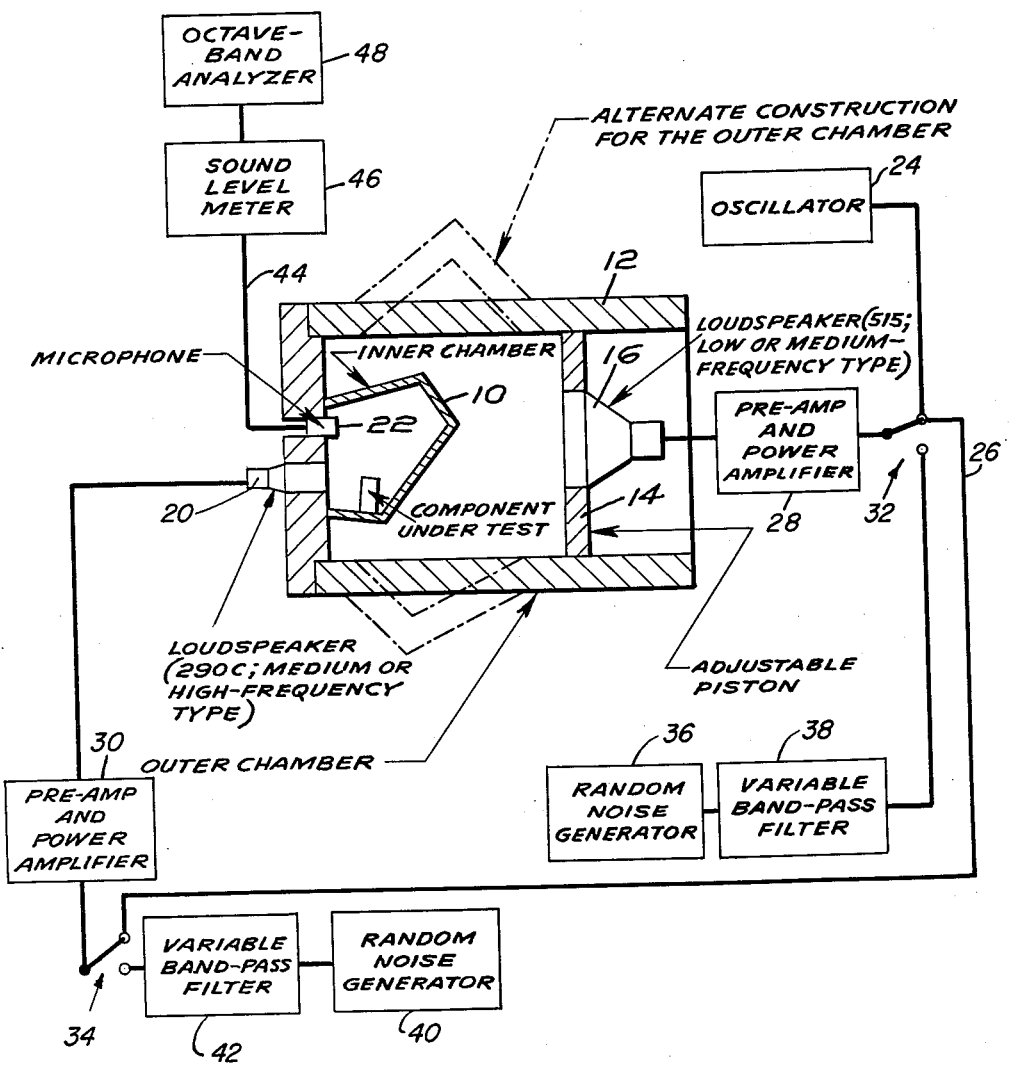
INVENTOR.
RICHARD K. KAMINSKI
BY:
Beau, Brooks, Buckley & Beau,
ATTORNEYS.

United States Patent Office 3,104,543
Patented Sept. 24, 1963

3,104,543
ACOUSTICAL VIBRATION TEST DEVICE
Richard K. Kaminski, Naugatuck, Conn., assignor, by mesne assignments, to Bell Aerospace Corporation, Wheatfield, N.Y., a corporation of Delaware
Filed May 5, 1960, Ser. No. 27,135
5 Claims. (Cl. 73—69)

This invention relates to the pre-testing of structures and operational equipment including all forms of mechanical, electrical, hydraulic, electronic devices, and the like, such as are expected to be subjected during service conditions to acoustical vibrations at the so-called high sound pressure levels.

It has been determined for example that structures and equipment components in high performance aircraft and missiles and the like are at times subjected to severe acoustical environments such as subject the parts and/or equipment components to vibration stresses seriously affecting the reliability of the structure and/or equipment. Accordingly, such devices must be pre-tested by suitable acoustical tests in order to insure maximum reliability under service conditions.

Whereas acoustical engineers have previously devised various forms of chambers for various test purposes, these mechanisms are usually inefficient and/or unsuitable for test purposes wherein high sound pressure levels are required. The acoustical environment to be contended with may exist either as a free, reverberant or resonant field, and may in some cases comprise a combination of these types of fields. Most airborne equipment is of course disposed inside of aircraft and missile compartments which function as small reverberation chambers producing diffuse broad-band random noises. In some cases the field becomes resonant, especially when produced within chambers that are tuned to produce standing waves. At resonance, low power sound sources generate very high sound pressure levels because of the amplification effects.

The system of the present invention contemplates a coupled acoustical test chamber which provides a special environment which can produce high sound pressure levels. Structural and equipment components to be tested are installed in an inner chamber portion thereof for exposure to a diffuse random noise which is reverberant-generated by separate sound sources, one of which delivers to the inner chamber containing the components to be tested while the other source delivers to a chamber externally thereof. The spectral distribution of the field may be varied as desired. It is a feature of the present invention that by use of the double chamber arrangement referred to, a low frequency spectral distribution may be produced, and through use of a relatively inexpensive environmental chamber one or more large sound sources may be coupled to the test piece containing chamber. This arrangement permits speaker isolation, and substantially no interference between the inner and outer chamber sound sources.

For a better understanding of the above indicated feature of my invention and of others which will hereinafter appear, reference may be made to the accompanying drawing forming a part of this application wherein the FIGURE shown is a schematic illustration of an acoustical test device in accordance with the present invention. The invention contemplates provision of an inner chamber for holding the component under test; said inner chamber being of special shape to prevent it from becoming resonant, whereby all the energy of the sound source may be directed to the component under test. Furthermore, the sound waves emitted by the low frequency sound source (delivering into the external chamber) will penetrate through the walls of the inner chamber to the component under test, although the high frequency sound waves generated by the sound source delivering into the inner chamber will not set up any objectionable conditions in the outer chamber. This arrangement results in greatly reducing the power requirement for the high frequency sound source.

Various suitable sound source devices are available for the purpose of the present invention; the sound levels desired, the acoustic field requirements, acoustical impedance of the test chamber, and service life required, are representative of the factors involved in selection of the preferred sound source. For example, suitable loudspeakers, sirens, high intensity sound transducers of the direct radiating and driver speaker type, are available on the market. Also, the modulated air flow type loudspeaker may be preferred in some cases. Manufacturers of special direct-radiating and driver speakers include; Transducers, Inc., Altec-Lansing and Stromberg-Carlson. The Stromberg-Carlson HLT 5010 woofer is suitable, and type HLT 5012 full-range loud-speaker is designed for operation over a 16 to 18,000 c.p.s. range. Most sirens are home-made sound sources; however, Ultransonis Corporation and Soundrive Engine Company are potential suppliers. The modulated air-flow type loud-speaker is made by Standford Research Institute, Altec-Lansing and RCA. Narrow-band sound can be produced by whistles; for example as made by the Gulton Industries. The Avco Acoustic Noise Generator is a special electro-mechanical transducer. Random noise with a 166 decibel level, or 170 decibels at discrete frequencies is claimed for this instrument.

A specific application of the invention is shown in the drawing herewith wherein the apparatus comprises an inner chamber 10 formed of Plexiglas wall material mounted within a rectangular resonant chamber 12; the length of the chamber 12 being variable through use of a positionally adjustable end wall or piston device as indicated at 14. A low or medium frequency type loud-speaker as indicated at 16 may be conveniently mounted in the movable wall 14. A loud-speaker of medium of high frequency type as indicated at 20 is arranged to deliver into the interior of the chamber 10 and this chamber also has positioned therein a microphone 22. An oscillator for the system is indicated by reference character 24 and by means of the conductor 26 extending therefrom is selectably connected to either or both of the loud-speakers 16 or 20 through the associated pre-amplifiers and power amplifiers 28 and 30 thereof. Thus, by controlling the switches 32 and 34, either or both of the loud-speakers 16 and 20 may be coupled to the oscillator 24. In the alternate position of the switch 32, the loud-speaker 16 is coupled to a random noise generator 36 and variable band-pass filter 38. Likewise, by manipulation of switch 34, the loud-speaker 20 is coupled to the random noise generator 40 and associated variable band-pass filter 42.

The microphone 22 is connected by means of conductor 44 to the sound level meter 46 and octave-band analyzer 48 by means of which the chamber 10 may be analyzed as to sound level over the entire spectrum under analysis.

By this arrangement there is little or no interference between the inner and outer chamber sound sources, it being particularly noted that the inner chamber is of non-rectangular form, having no walls exposed within the outer chamber parallel to a wall of the outer chamber. This prevents the system from becoming resonant, and allows substantially all of the energy produced by the sound sources to be directed to the component of the test. It is by virtue of this specific arrangement of parts that a superior test facility is provided for simulation of high sound pressure level environments such as are anticipated to be met for example under service conditions by high performance aircraft, missiles, or the like. Hence, components such as are propense to structural failures or equipment malfunctions under anticipated service conditions as aforesaid and which are not otherwise pre-detectable are revealed by the test apparatus of the present invention. Thus, it will be appreciated, that the inner chamber 10 is reverberant rather than resonant, thus substantially confining the sound generated by the loud-speaker 20 to this chamber alone whereas the walls of the chamber 10 will pass, in unidirectional fashion, the lower frequencies generated by the loud-speaker 16 more readily than the higher frequencies generated thereby. In this way, the specimen being tested may be subjected to both low frequency and high frequency sounds at high levels and the particular arrangement shown permits of subjecting the component under test to substantially uniform sound level over a wide spectrum of frequency if desired or particular portions of the frequency spectrum may be emphasized more particularly than others.

It will of course be appreciated that whereas only one specific form of the invention has been shown and described in detail, various changes may be made therein without departing from the spirit of the invention or the scope of the following claims.

I claim:

1. In an article testing system, wall means defining a closed low frequency chamber, means for generating low frequency sound in said low frequency chamber, second wall means within said low frequency chamber defining a closed article testing high frequency chamber isolated from said low frequency chamber, and means for generating high frequency sound in said article testing chamber, said second wall means defining an irregular, non-resonant shape for said article testing chamber and being of thin section to pass low frequency sound from the low frequency chamber into the testing chamber.

2. In an article testing system, a pair of closed chambers including wall means defining at least a part of one chamber and isolating the chambers from each other, sound generating means in one of the chambers capable of generating predominantly low frequency sound, sound generating means in the other of said chambers capable of generating predominantly high frequency sound, and said wall means being of thin section to pass low frequency sound energy while being formed of angularly intersecting portions to reflect high frequency sound energy whereby an article placed in said other cavity is subjected to a wide spectrum of sound.

3. A test device for subjecting articles to be tested to a wide spectrum of sound energy, comprising
   wall means defining a relatively large completely closed outer chamber,
   means for generating relatively low frequency sound energy within said outer chamber,
   wall means defining a relatively small, completely closed inner chamber,
   means for generating relatively high frequency sound energy within said inner chamber,
   the wall means defining said inner chamber being exposed at least in part within and projecting into the confines of said outer chamber and such wall means defining said inner chamber having angularly intersecting portions imparting an irregular, non-resonant shape to the inner chamber, and such parts of the wall means defining said inner chamber as project into and are exposed within said outer chamber being of thin section so as to pass the relatively low frequency sound energy from the outer chamber to the inner chamber,
   and means for mounting a device to be tested within said inner chamber.

4. A test device for subjecting articles to be tested to a wide spectrum of sound energy, comprising
   wall means defining a completely closed outer chamber, said wall means including a front wall and a rear wall,
   sound generating means mounted on said rear wall for generating relatively low frequency sound energy and positioned to direct the generated sound energy toward said front wall,
   second wall means defining, in cooperation with a portion of said front wall, a completely closed inner chamber in which the second wall means are, in turn, enclosed within said outer chamber and exposed to the directed sound energy of said sound generating means,
   second sound generating means mounted on said front wall for generating relatively high frequency sound energy and positioned to generate the relatively high frequency sound energy directly within said inner chamber.
   said second wall means comprising angularly intersecting portions imparting an irregular, non-resonant shape to said inner chamber, and said second wall means being of thin section to pass the sound energy from the outer chamber therethrough without substantial attenuation.

5. An acoustical test device comprising,
   an inner chamber adapted to enclose a component to be tested,
   an outer chamber substantially enclosing said inner chamber,
   a relatively high frequency sound generator mounted within said inner chamber,
   a relatively low frequency sound generator mounted within said outer chamber, and
   said inner chamber being of irregular, non-resonant shape and of thin wall-section to pass the sound energy from the outer chamber to the inner chamber.

References Cited in the file of this patent
UNITED STATES PATENTS

| | | |
|---|---|---|
| 2,431,962 | Rettinger | Dec. 2, 1947 |
| 2,808,121 | Goettner | Oct. 1, 1957 |
| 2,859,610 | Dickey | Nov. 11, 1958 |
| 2,927,657 | Patla et al. | Mar. 8, 1960 |